United States Patent [19]
Rozman et al.

[11] Patent Number: 5,384,527
[45] Date of Patent: Jan. 24, 1995

[54] ROTOR POSITION DETECTOR WITH BACK EMF VOLTAGE ESTIMATION

[75] Inventors: Gregory I. Rozman; Vijay K. Maddali, both of Rockford; Albert L. Markunas, Roscoe, all of Ill.

[73] Assignee: Sundstrand Corporation, Rockford, Ill.

[21] Appl. No.: 61,364

[22] Filed: May 12, 1993

[51] Int. Cl.$^6$ ............................................. H02K 29/06
[52] U.S. Cl. ........................................ 322/10; 318/254
[58] Field of Search ................. 322/10; 318/138, 254, 318/439, 721, 722

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,772,802 | 9/1988 | Glennon et al. | 290/31 |
| 4,808,903 | 2/1989 | Matsui et al. | 318/800 |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,023,527 | 6/1991 | Erdman et al. | 318/254 |
| 5,028,803 | 7/1991 | Reynolds | 290/31 |
| 5,040,366 | 8/1991 | Schulze | 60/39.08 |
| 5,051,670 | 9/1991 | De Piola | 318/434 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,132,604 | 7/1992 | Shimane et al. | 322/10 |
| 5,134,349 | 7/1992 | Kruse | 318/254 |
| 5,140,245 | 8/1992 | Stacey | 318/723 |
| 5,198,733 | 3/1993 | Wright | 318/254 |
| 5,202,613 | 4/1993 | Kruse | 318/254 |
| 5,221,881 | 6/1993 | Cameron | 318/254 |
| 5,231,338 | 7/1993 | Bulgarelli et al. | 318/254 |
| 5,233,275 | 8/1993 | Danino | 318/254 |

FOREIGN PATENT DOCUMENTS 2206751 1/1989 United Kingdom.

OTHER PUBLICATIONS

E. Iizuka, et al., *IEEE Transactions on Industry Applications*, vol. 1A-21, No. 4, May/Jun. 1985.

Furuhashi, et al., *IEEE Transactions on Industrial Electronics*, vol. 39, No. 2, Apr. 1992.

*Primary Examiner*—Kristine L. Peckman
*Attorney, Agent, or Firm*—Marshall, O'Toole, Gerstein, Murray & Borun

[57] ABSTRACT

A detector for detecting rotor position of a brushless generator having a motive power shaft and a main generator portion having a set of armature phase windings capable of receiving AC power and developing a back EMF voltage during operation in a starting mode, includes a circuit coupled to the set of armature phase windings and capable of responding to the AC power for producing a back EMF estimate signal representing an estimate of the back EMF voltage. The detector also includes a circuit for converting the back EMF estimate signal into an indication of the angular position of the motive power shaft.

36 Claims, 8 Drawing Sheets

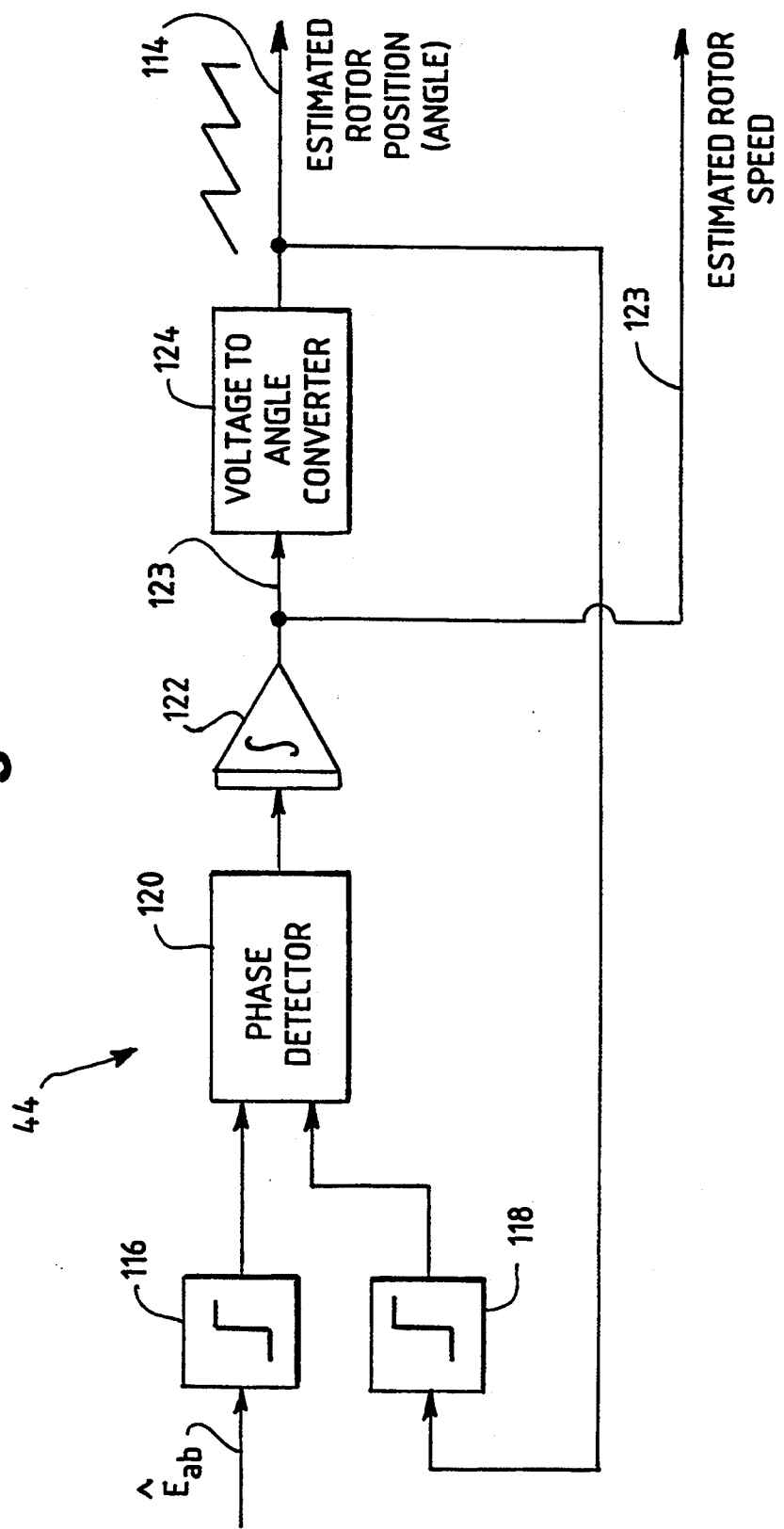

ROTOR POSITION DETECTOR WITH BACK EMF VOLTAGE ESTIMATION

TECHNICAL FIELD

The present invention relates generally to electromagnetic machines, and more particularly to a detector for detecting the rotor position of a brushless generator and a control system incorporating such a detector.

BACKGROUND ART

An auxiliary power unit (APU) system is often provided on an aircraft and is operable to provide auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a brushless, synchronous generator is coupled to and driven by the gas turbine engine during operation in a starting mode whereupon the generator develops electrical power.

As is known, an electromagnetic machine may be operated as a motor to convert electrical power into motive power. Thus, in those applications where a source of motive power is required for engine starting, such as in an APU system, it is possible to dispense with the need for the dedicated starter motor and operate the generator as a motor during the starting sequence to accelerate the engine to self-sustaining speed. This capability is particularly advantageous in aircraft applications where size and weight must be held to a minimum.

The use of a generator in starting and generating modes in an aircraft application has been realized in a variable-speed, constant-frequency (VSCF) power generating system. In such a system a brushless, three-phase synchronous generator operates in the generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

The generator of such a VSCF system is operated as a motor in the starting mode to convert electrical power supplied by an external AC power source into motive power which is provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion field windings via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

In order to properly accelerate the generator and prime mover during operation in the starting mode, it is necessary to properly commutate or switch the currents among the armature windings of the generator. In the past, proper commutation was achieved using an absolute position sensor, such as a resolver, a synchro, an optical encoder or hall effect devices. For example, in Lafuze, U.S. Pat. No. 3,902,073 three Hall sensors are mounted in an air gap of a PMG 120 electrical degrees apart with respect to permanent magnet rotor pole pairs. As the rotor of the PMG rotates, the voltage output of each Hall sensor switches on and off as a function of the rotor position thereby generating three square wave voltages spaced apart by 120 electrical degrees. The outputs from the Hall sensors are representative of the position of the PMG rotor. The output signals from the Hall sensors are used to control switching elements in cycloconverters to switch current to armature windings of a main generator portion.

Use of an external absolute position sensor entails considerable expense in the position sensor itself and associated electronics, and further results in extra wires and the need for an extra assembly step to install the components. Also, operational parameters often limit the accuracy of the sensor.

In view of the foregoing difficulties, other approaches have been taken in an effort to detect rotor position without the need for absolute position sensors. In the case of a brushless DC motor control, a back EMF approach has been used to detect rotor position. The back EMF of the motor is defined by the following equation:

$$E_{emf} = K\omega \sin \alpha$$

where K is a constant, $\omega$ is the angular speed of the motor and $\alpha$ is the electrical phase angle of the rotor. From the foregoing equation, it can be seen that if back EMF can be detected, rotor electrical phase angle can be determined and thus proper commutation of the armature windings of the motor can be achieved. The back EMF voltage can be detected using either of two methods, referred to as the direct method and the indirect method.

The direct method can be used to directly measure phase back EMF voltage only when the phase winding is not energized by the inverter connected thereto and when the winding is not short circuited either by closed switches in the inverter or by conducting flyback diodes in the inverter. Such conditions can be realized when a 120 degree commutation algorithm is utilized. In this case, a voltage reading is taken after a short delay following switching of the phase winding off to ensure complete current decay by the free-willing diodes. This direct technique is described in a paper entitled "Microcomputer Control for Sensorless Brushless Motor" by E. Iizuka et al., *IEEE Transactions on Industry Application*, Vol. IA-21, No. 4, May/June 1985.

The indirect method is based on estimating the back EMF from the motive terminal voltage and phase currents. This method is suitable for both 120 and 180 degree commutation algorithms. One technique that uses this method is described in a paper entitled "Position - and - Velocity Sensorless Control for Brushless DC Motor Using an Adaptive Sliding Mode Observer" by Furuhashi et al., *IEEE Transactions on Industrial Electronics*, Vol. 39, No. 2, April 1992.

Because the back EMF voltage of a motor is zero at standstill and the signal to noise ratio is small at lower speeds, the reliable determination of rotor position by detecting back EMF is limited at low rotor speeds.

A method of using a permanent magnet generator as a position sensor for motor/generator start is described in Stacey U.S. Pat. No. 5,140,245. A standard brushless generator is equipped with a PMG which is used as an emergency electric power source and as a source of control power during a normal or generating mode of operation. The PMG develops a multi-phase output which is supplied to a high resolution phase-locked loop having a binary counter which develops an output signal representing shaft position. This method, however, is limited to the situation where the number of PMG rotor poles is equal to or less than the number of poles on the main generator portion rotor so that ambiguous position readings are avoided.

SUMMARY OF THE INVENTION

In accordance with the present invention, a detector for detecting rotor position of brushless generator utilizes inexpensive components and operates in a simple and effective manner.

More particularly, a detector for detecting rotor position of a brushless generator having a motive power shaft and a main generator portion having a set of armature phase windings capable of receiving AC power and developing a back EMF voltage during operation in a starting mode, includes means coupled to the set armature phase windings and capable of responding to the AC power for producing a back EMF estimate signal representing an estimate of the back EMF voltage and means for converting the back EMF estimate signal into an indication of angular position of the motive power shaft.

Preferably, the producing means includes first means responsive to the current developed in first and second main generator portion armature phase windings for developing a current magnitude signal, second means responsive to the voltage developed in the first and second main generator portion armature phase windings for developing a line-to-line voltage signal and means responsive to the current magnitude signal and the line-to-line voltage signal for deriving the back EMF estimate signal. Also, preferably, the deriving means includes a first summer for subtracting the current magnitude signal from a current estimate signal to obtain a first output signal, a first conditioner for conditioning the first output signal to produce the back EMF estimate signal, a second conditioner for conditioning the current estimate signal to obtain a conditioned current estimate signal, a second summer for subtracting the conditioned current estimate signal and the back EMF estimate signal from the line-to-line voltage signal to obtain a second output signal and third means responsive to the second output signal for developing the current estimate signal.

The converting means may include a phase-locked loop having first and second zero crossing detectors, a phase detector, and means coupled to the phase detector for producing the indication of the angular position of the motive power shaft. Preferably, the producing means includes an integrator and a voltage-to-angle converter.

Alternatively, the converting means may include means responsive to the back EMF estimate signal for deriving a number of interval pulses per revolution of the motive power shaft, means coupled thereto for measuring time periods between adjacent interval pulses, and means coupled to the measuring means for converting the measured time periods into an indication of the angular position of the motive power shaft. The measuring means may comprise a counter which accumulates clock pulses during time periods between adjacent interval pulses and may include means which periodically reset the counter a certain number of times during each revolution of the motive power shaft. The converting means may also include an inverter for inverting a counter output signal developed by the counter to obtain an indication of the speed of the motive power shaft and may include an integrator coupled to the inverter to develop the angular position indication.

In accordance with a further aspect of the present invention, a starting system control for operating a brushless generator in a starting mode to convert electrical power into motive power wherein the brushless generator includes a motive power shaft and a main generator portion having a set of armature phase windings which receive AC power and which develop a back EMF voltage during operation in the starting mode, includes means coupled the set of armature phase windings and responsive to the AC power for producing a back EMF estimate signal representing an estimate of the back EMF voltage. Means are provided for converting the back EMF estimate signal into indications of the speed and angular position of the motive power shaft and means are coupled to the converting means for delivering the AC power to the set of armature phase windings in dependence upon the speed and angular position indications.

Preferably, the delivering means includes means for developing a torque command signal and an electrical angle command signal from the speed and angular position indications and an inverter responsive to the torque command signal and the electrical angle command signal which develops the AC power.

In accordance with another aspect of the present invention, a method of detecting rotor position of a brushless generator having a motive power shaft and a main generator portion having a set of armature phase windings which receive AC power and which develop a back EMF voltage during operation in a starting mode, includes the steps of estimating the back EMF voltage developed at the set of armature phase windings to produce a back EMF estimate signal and converting the back EMF estimate signal into an indication of angular position of the motive power shaft.

Preferably, the method also includes a step of delivering AC power to the set of main generator portion armature phase windings in dependence upon the angular position indication.

In accordance with a further aspect of the invention, a back EMF voltage estimator for use in a brushless generator having a motive power shaft and a main generator portion having first, second and third armature phase windings capable of receiving AC power and capable of developing a back EMF voltage during operation in a starting mode, includes means responsive to currents flowing in the first and second armature phase windings for developing a current magnitude signal and means responsive to voltages developed at the first and second armature phase windings for developing a line-to-line voltage signal. The estimator includes means responsive to the current magnitude signal and the line-to-line voltage signal for deriving the back EMF estimate signal.

The detector of the present invention does not require the use of an absolute position sensor, nor is it limited to use with any particular commutation algorithm nor is there any constraint on the number of PMG rotor poles relative to the number of main generator portion rotor poles.

BRIEF DESCRIPTION OF THE DRAWINGS

FIG. 4 comprises a block diagram of a first embodiment of the angle reconstruction unit of FIG. 2;

DESCRIPTION OF THE PREFERRED EMBODIMENT

Figure 1:
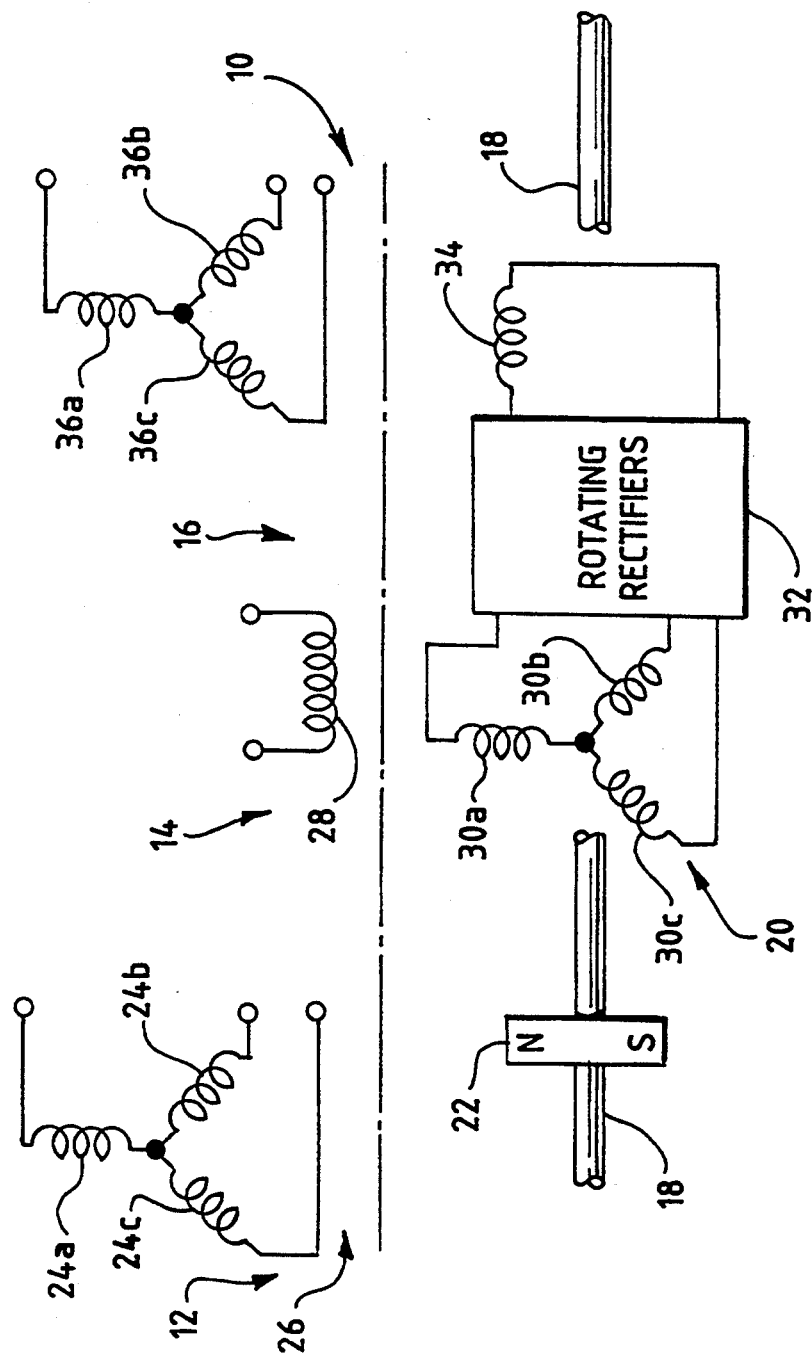
FIG. 1 comprises a combined block and schematic diagram of a brushless, synchronous generator.

Referring now to FIG. 1A, a brushless, synchronous generator 10 includes a permanent magnet generator (PMG) 12, an exciter portion 14 and a main generator portion 16. The generator 10 further includes a motive power shaft 18 interconnecting a rotor 20 of the generator 10 and a prime mover 21, such as a gas turbine engine. In a specific application of the present invention, the generator 10 and the prime mover 21 together may comprise an aircraft auxiliary power unit (APU) 22, although the present invention is equally useful in other prime mover/generator applications.

The rotor 20 carries one or more permanent magnets 23 which form poles for the PMG 12. Rotation of the motive power shaft 18 causes relative movement between the magnetic flux produced by the permanent magnet 23 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. Three-phase main generator portion armature windings 36a–36c are disposed in the stator 26.

During operation in a generating mode, at least one, and preferably all three of the PMG armature windings 24a–24c are coupled through a rectifier and voltage regulator (not shown) to the exciter portion field winding 28. As the motive power shaft 18 is rotated, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional. As seen in FIG. 1B, the AC voltages are supplied through a contactor set 37 to an APU power distribution network 38 and thence to one or more loads (not shown).

Often, it is desirable to use the brushless generator 10 as a motor to bring the prime mover 21 up to self-sustaining speed. This operation is accomplished by providing electrical power to the main generator portion field winding 34 via the exciter 14, providing AC power to the main generator portion armature windings 36a–36c and suitably commutating the currents flowing in the windings 36a–36c to cause the motive power shaft 18 to rotate. In a specific embodiment, the electrical power for the generator 10 is developed by an APU start converter 39, FIG. 1B, which receives external electrical power and which is connected by contactor sets 40a, 40b to the exciter field winding 28 and the armature windings 36a–36c, respectively. Various methods have been devised for controlling the power supplied to the main generator field winding 34 via the exciter 14. Inasmuch as the method of exciter control forms no part of the present invention, it will not be described in detail herein.

Figure 2:
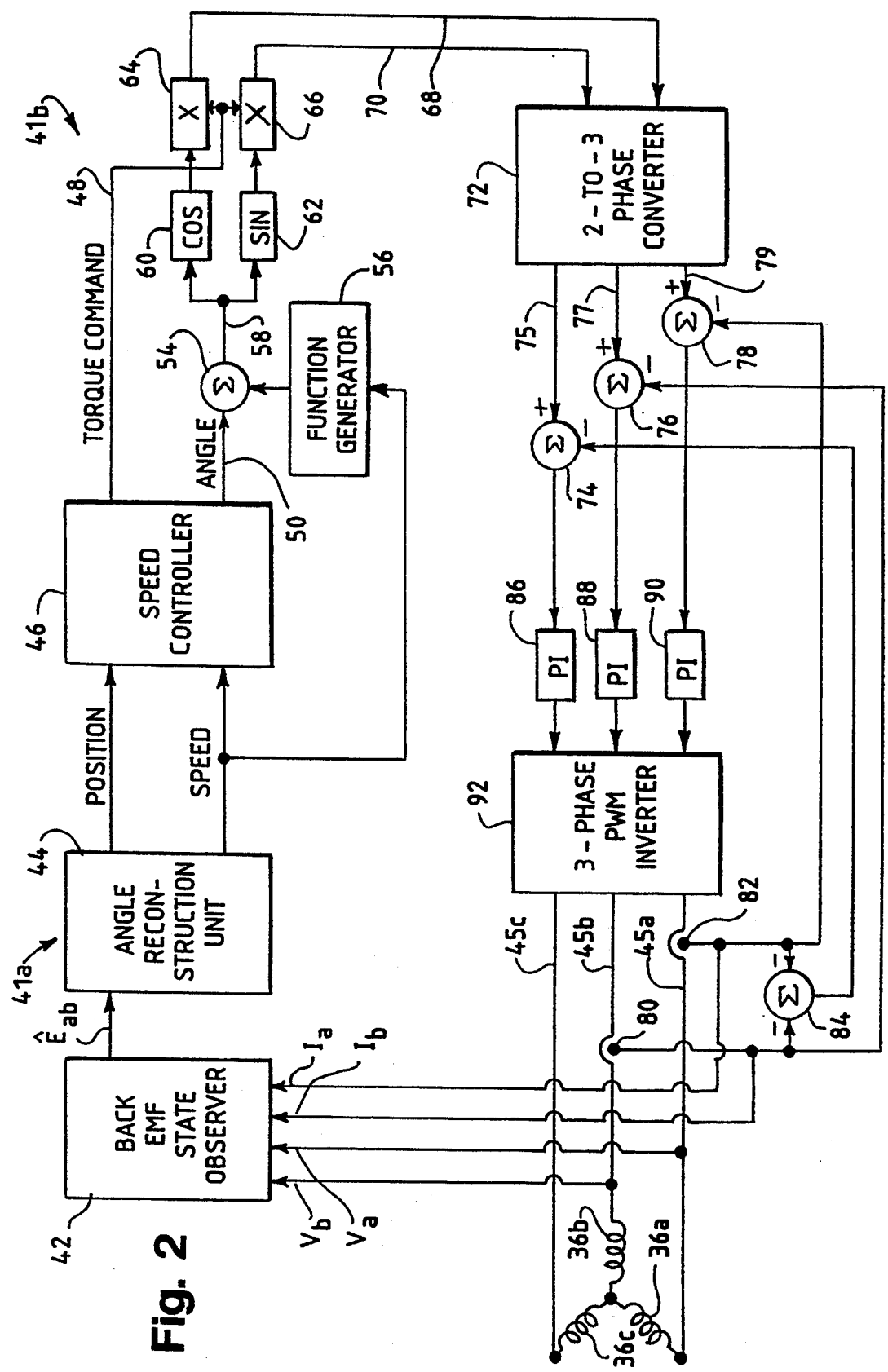
FIG. 2 comprises a block diagram illustrating a rotor position detector and a starting system control according to the present invention.

FIG. 2 illustrates the main generator portion armature windings 36a–36c of the generator 10 together with a rotor position detector 41a and a starting system control 41b for operating the generator 10 in a starting mode to convert electrical power into motive power. While not shown, power may also be provided to the exciter field winding 28, and thus to the exciter armature windings 30a–30c and thus to the main generator portion field windings 34 by any suitable means during operation in the starting mode. The application of power to the exciter field winding 28 forms no part of the present invention and will not be described in detail herein. The rotor position detector 41a includes a back EMF state observer 42 and an angle reconstruction unit 44. The back EMF state observer 42 is responsive to voltage signals $V_a$ and $V_b$ developed at two lines 45a, 45b, which, together with a line 45c, are coupled to the main generator portion armature phase windings 36a–36c, respectively. The back EMF state observer 42 is also responsive to current signals $I_a$ and $I_b$ which represent the magnitudes of current flowing in the lines 45a and 45b, and produces a back EMF estimate signal $\hat{E}_{ab}$ indicative of the back EMF voltage appearing across the lines 45a and 45b. The angle reconstruction unit 44 responds to the back EMF estimate signal $\hat{E}_{ab}$ a to develop signals representing the position and speed of the motive power shaft 18 which are delivered to a speed controller 46.

The speed controller 46 develops a torque command signal on a line 48 representing the commanded torque to be produced by the generator 10 and a further signal on a line 50 representing the mechanical position of the motive power shaft 18. The signal on the line 50 is summed with a phase advance signal by a summer 54. The phase advance signal is developed by a function generator 56 and is dependent upon the speed of the motive power shaft 18 as detected by the angle reconstruction unit 44. The function generator 56 provides increasing phase advance as speed increases in a high speed range. The summer 54 develops an electrical angle command signal on a line 58 which is supplied to first and second functional blocks 60, 62 which generate a cosine waveform signal and a sine waveform signal, respectively, each of which has the same frequency as the electrical angle command signal on the line 58.

Second and third multipliers 64, 66 are coupled to the functional blocks 60, 62, respectively, and multiply the outputs thereof with the torque command signal on the line 48. The output signals generated by the multipliers 64, 66 are provided to a 2-to-3 phase converter 72 via a pair of lines 68, 70. The phase converter 72 converts those signals into three-phase sinusoidal current signals which are in turn supplied to three summers 74, 76, and 78 via lines 75, 77, and 79, respectively. Each of the summers 74, 76, and 78 sums one of the three-phase current signals produced by the phase converter 72 with a signal representing the magnitude of a phase current of the AC power to obtain an error signal. In the case of the summers 76 and 78, the phase current magnitudes are detected by current sensors 80, 82 while the phase current magnitude for the summer 74 is obtained by a summer 84 which adds (in a negative sense) the magnitudes developed by the current sensors 80, 82. The error signals are processed by gain and compensation units 86, 88, and 90, preferably of the proportional-integral type, and are supplied to a three-phase pulse-width modulated (PWM) inverter 92. The inverter 92 is operated in a current mode of operation according to known techniques to deliver AC power through the lines 45a–45c to the set of main generator portion armature windings 36a–36c in dependence upon the speed and angular position signals developed by the angle reconstruction unit 44.

The back EMF state observer 42 estimates the back EMF voltage produced by the generator 10 while it is operating in the starting mode. During the starting mode, currents flow in the armature phase windings 36a–36c according to the following current state equation:

$$\frac{d(I_{ab})}{dt} = \frac{1}{L}(V_{ab} - E_{ab} - RI_{ab})$$

Where:
$V_{ab}$ is the line-to-line voltage;
$E_{ab}$ is the line-to-line back EMF voltage across the lines 45a and 45b;
$I_{ab}$ is the difference between the current signals $I_a$ and $I_b$ produced by the current sensors 82, 80, respectively;
L is the armature winding inductance; and
R is the armature winding resistance.

Figure 3:
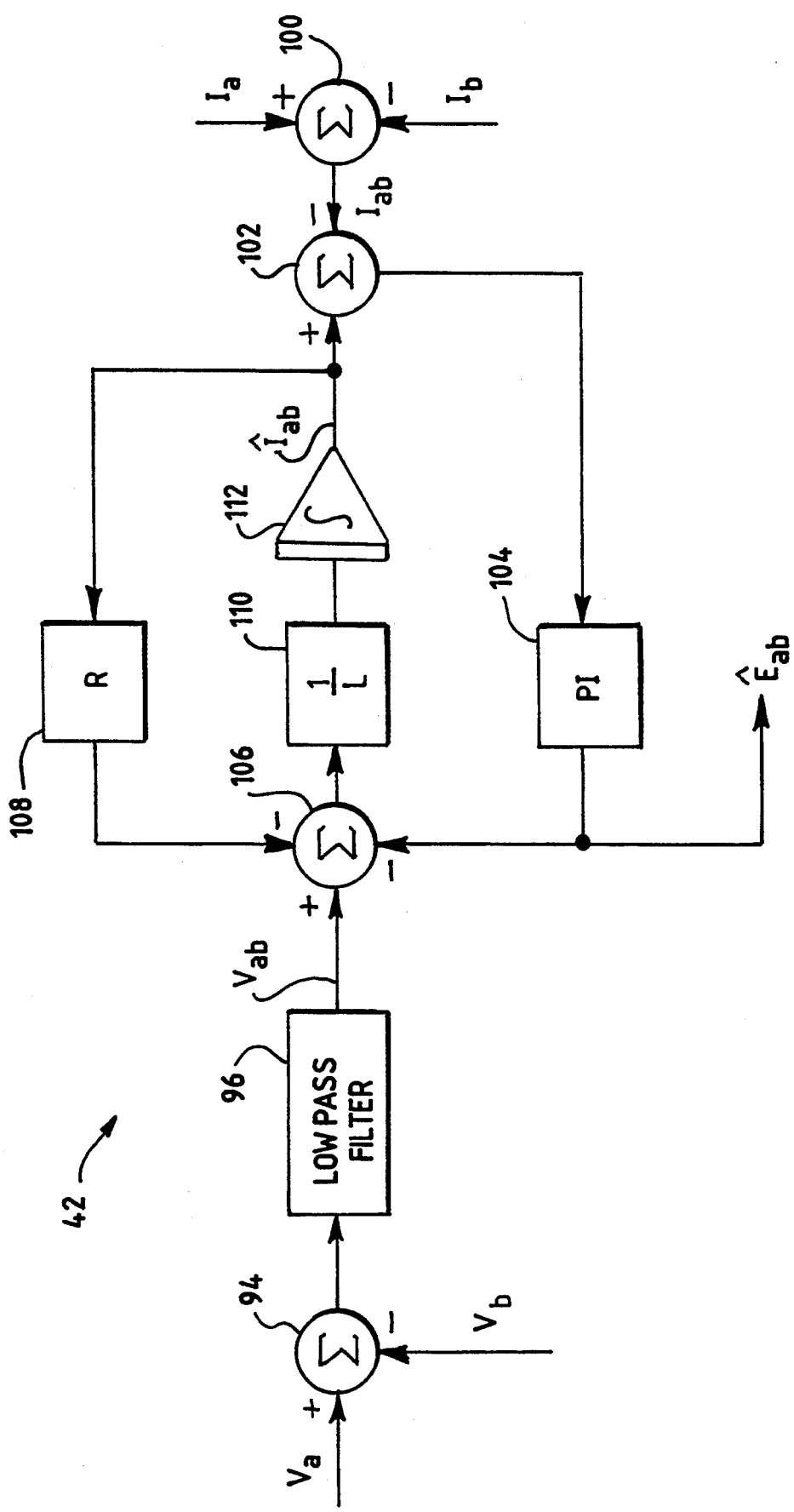
FIG. 3 comprises a block diagram of the back EMF state observer of FIG. 2.

Although the above formula can be implemented by differentiating the currents flowing in the main generator portion armature windings 36a–36c, known differentiation processes are vulnerable to noise. To avoid differentiation, the back EMF state observer 42 is configured as shown in FIG. 3. The voltages $V_a$ and $V_b$ appearing at the lines 45a and 45b, respectively, are delivered to a summer 94, an output of which is passed through a low pass filter 96 to produce the line-to-line voltage signal $V_{ab}$. The current signal $I_b$ is subtracted from the current signal $I_a$ by a summer 100 to produce the current magnitude signal $I_{ab}$. The current magnitude signal $I_{ab}$ is delivered to an inverting input of a summer 102 while a current estimate signal $\hat{I}_{ab}$, produced as described below, is delivered to a non-inverting input of the summer 102. The output of the summer 102 is delivered to a conditioner 104, which preferably comprises a proportional-integral type compensator, but which could also comprise a nonlinear controller. The conditioner 104 produces the back EMF estimate signal $\hat{E}_{ab}$ and delivers such signal to an inverting input of a summer 106 and to the angle reconstruction unit 44 of FIG. 2. The current estimate signal $\hat{I}_{ab}$ is delivered to a conditioner 108 preferably comprising a gain unit with a gain value of R and having an output coupled to an inverting input of the summer 106. The summer 106 subtracts the current estimate signal $\hat{I}_{ab}$ as conditioned by conditioner 108 and the back EMF estimate signal $\hat{E}_{ab}$ from the line-to-line voltage signal $V_{ab}$ developed by the low pass filter 96. An output signal developed by the summer 106 is conditioned by a conditioner 110, preferably comprising a gain unit having a gain value of 1/L, and integrated by an integrator 112 to produce the terminal current estimate signal $\hat{I}_{ab}$.

Although the back EMF state observer 42 is shown implemented by analog components, it should be noted that the back EMF state observer 42 could, instead, be implemented by a microprocessor suitably programmed to perform the functions described above.

Referring now to FIG. 4, a first embodiment of the angle reconstruction unit 44 is shown in greater detail. This embodiment comprises a phase-locked loop which responds to the back EMF estimate signal $\hat{E}_{ab}$ to develop the indication of the angular position of the motive power shaft 18 at an output 114. Zero crossing detectors 116 and 118 detect the zero crossings of the back EMF estimate signal $\hat{E}_{ab}$ and the angular position indication developed at the output 114 to produce square wave signals which are delivered to a phase detector 120. The phase detector 120 compares the outputs of zero crossing detectors 116 and 118 to produce an error signal indicative of the phase difference between the back EMF estimate signal $\hat{E}_{ab}$ and the angular position indication. The integrator 122 integrates the error signal and the integrated error signal is passed via a line 123 to a voltage-to-angle converter 124, which preferably comprises a voltage-controlled oscillator. The voltage-to-angle converter 124 produces a ramp signal having a magnitude that is indicative of the angular position of the motive power shaft 18.

The signal generated on the line 123, which is generated by the integration of the phase errors detected by the phase detector 120, has a magnitude that increases with frequency. Thus, the signal on the line 123 is representative of the estimated speed of the motive power shaft 18.

Figure 4A:
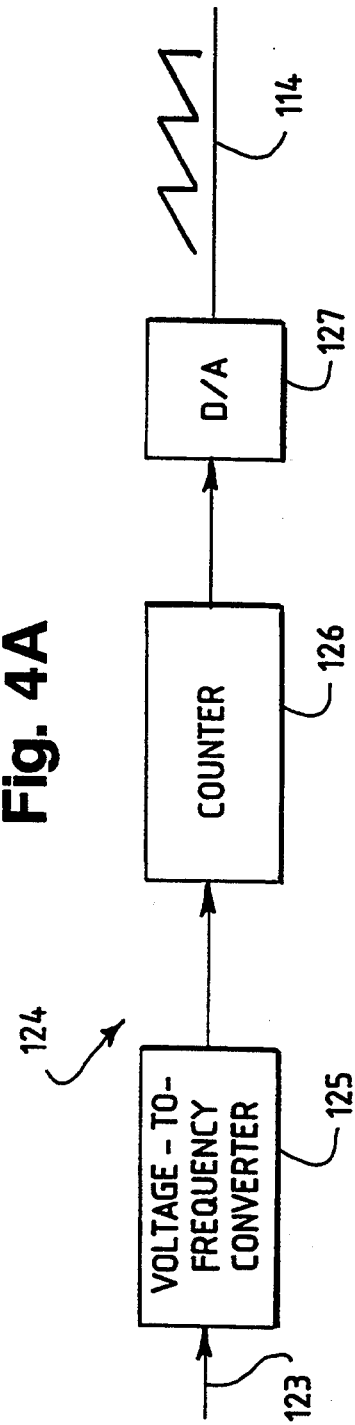
FIG. 4A comprises a block diagram of a first embodiment of the voltage-to-angle converter of FIG. 4.

FIG. 4A illustrates a first embodiment of the voltage-to-angle converter 124 shown schematically in FIG. 4. The converter 124 includes a voltage-to-frequency (V/F) converter 125 connected to receive the speed signal output by the integrator 122 (FIG. 4). Based on the magnitude of the speed signal, the V/F converter 125 generates an output signal of a particular frequency that is provided to the count input of a counter 126. The count signal generated by the counter 126 is provided to a digital-to-analog (D/A) converter 127, which generates a ramp signal having a magnitude related to rotor position. In operation, as the magnitude of the speed signal on the line 123 increases, the frequency of the signal generated by the V/F converter 125 increases, thus increasing the rate at which the counter 125 counts and increasing the frequency of the ramp signal generated by the D/A converter 127. Preferably, the counter 126 automatically resets, such as a modulo counter, when its count reaches a predetermined value, thus causing the downward portions of the ramp signal to occur automatically.

Figure 4B:
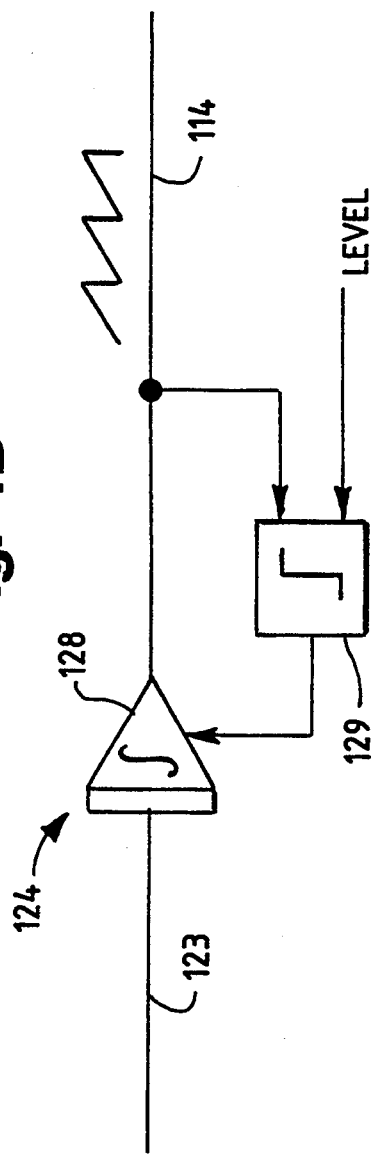
FIG. 4B comprises a block diagram of a second embodiment of the voltage-to-angle converter of FIG. 4.

FIG. 4B illustrates a second embodiment of the voltage-to-angle converter 124 shown schematically in FIG. 4. The converter 124 includes an integrator 128 connected to receive the speed signal output by the integrator 122 (FIG. 4). The integrator 128 generates a ramp signal having a magnitude related to rotor position. The integrator 128 is periodically reset by the output of a level comparator 129 when the integrator output reaches a predetermined level, which causes the downward sloping portions of the ramp signal.

Figure 5:
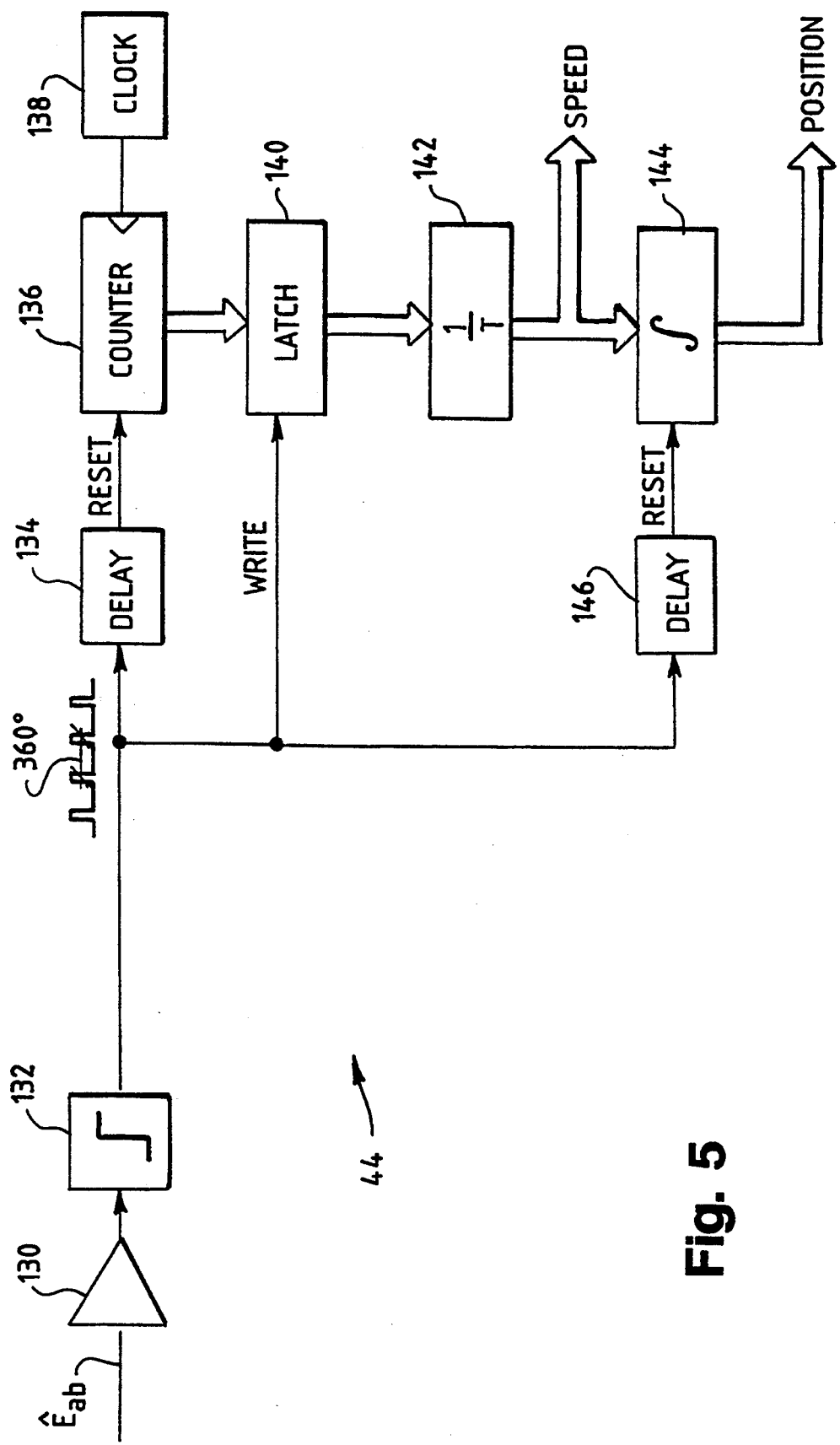
FIG. 5 comprises a block diagram of a second embodiment of the angle reconstruction unit of FIG. 2.

Referring now to FIG. 5, an alternative embodiment of the angle reconstruction unit 44 is shown in greater detail. The back EMF estimate signal $\hat{E}_{ab}$ is supplied to an interface amplifier 130 and a zero crossing detector 132 which produces a narrow pulse each time the $\hat{E}_{ab}$ signal rises upwardly through the zero axis, which occurs every 360 electrical degrees. The output of the zero crossing detector 132 is provided to a delay circuit 134 which in turn provides a reset signal to a counter 136. The counter 136 accumulates clock pulses produced by a clock 138 and is reset every 360° of the back EMF estimate signal $\hat{E}_{ab}$. The output of the counter 136 represents the time that elapses between consecutive pulses produced by the zero crossing detector 132. The falling edge of each pulse comprises a write command to a latch 140 which latches the output of the counter 136. The output of the latch 140 is inverted, i.e., the reciprocal thereof is calculated, by a circuit 142, which generates a signal having a magnitude that is representative of the speed of the motive power shaft 18, and thus of the rotor 20.

The speed signal generated by the circuit 142 is supplied to an integrator 144, which integrates the speed signal to generate a signal having a magnitude that is representative of the angular position of the motive power shaft 18, and thus of the rotor 20. The integrator 144 is reset every 360° of rotation of the rotor 20 via a reset signal generated by a delay circuit 146 connected to receive the 360°-spaced pulses generated by the zero crossing detector 132 so that a ramp-shaped position signal is generated.

Figure 6:
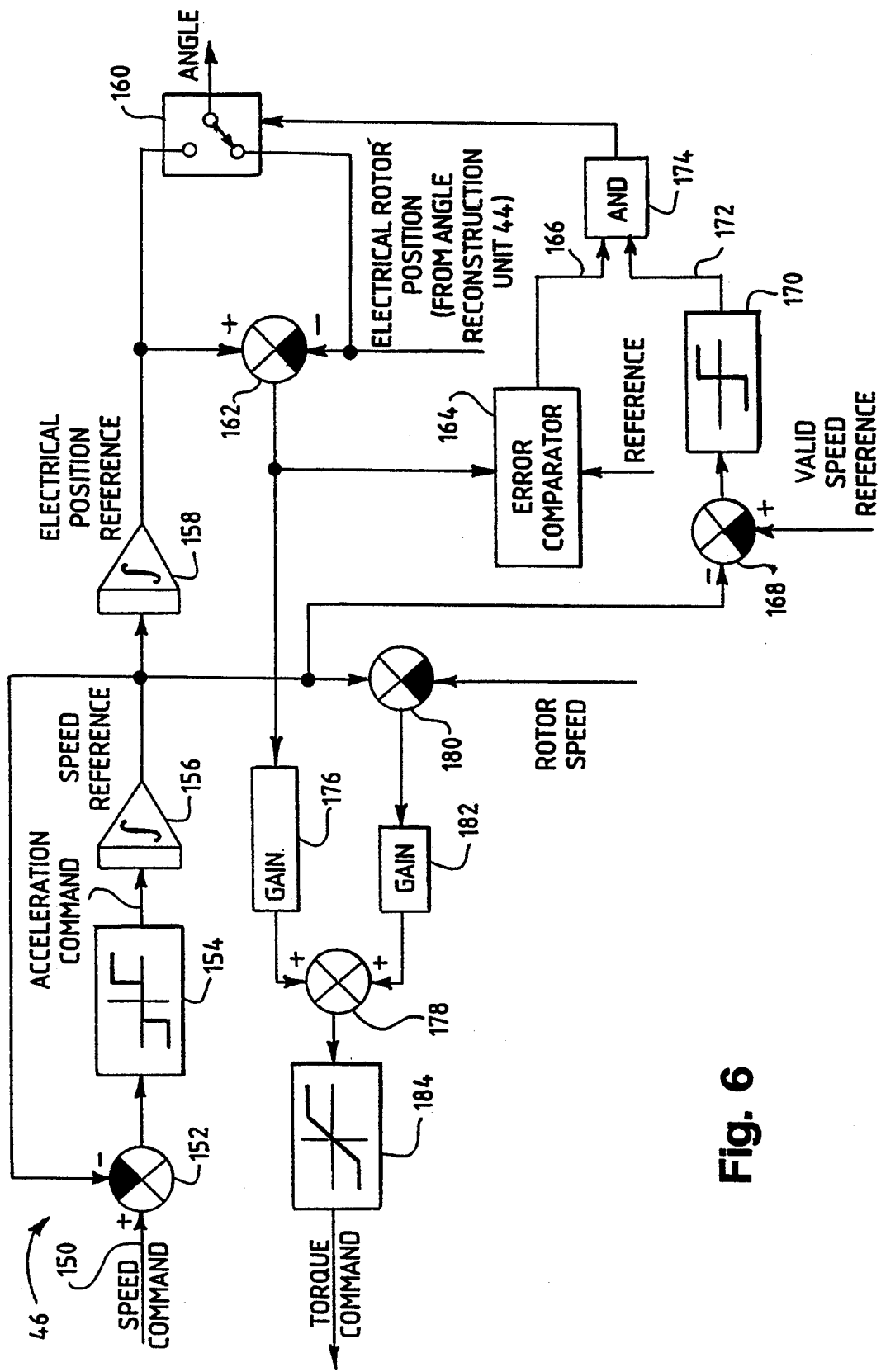
FIG. 6 comprises a block diagram of the speed controller of FIG. 2.

FIG. 6 illustrates the speed controller 46 in greater detail. A speed command signal may be developed on a line 150 which is coupled to a non-inverting input of a summer 152. The speed command may comprise a step voltage from a first voltage to a second, higher voltage or may comprise any other type of waveform as desired. The output of the summer 152 is coupled to a function generator 154 which develops an acceleration command signal which is, in turn, integrated by an integrator 156 to produce a speed reference signal. The speed reference signal is fed back to an inverting input of the summer 152, and hence the elements 152, 154, and 156 comprise a closed-loop circuit. The speed reference signal is integrated by a further integrator 158 to develop a position reference signal which is provided to a controllable switch 160 and to a non-inverting input of a summer 162. The angular position indication comprising the position signal from the angle reconstruction unit 44 of FIG. 2 is also provided to the controllable switch 160 and is further provided to an inverting input of the summer 162. The summer 162 produces a position error signal indicative of the difference between the derived position reference signal and the actual rotor position developed by the angle reconstruction unit 44. The position error signal is provided to an error comparator 164 which compares the position error signal with an error reference to produce a high state signal on a line 166 when the position error signal is less than the error reference.

Furthermore, a summer 168 subtracts the speed reference signal produced by the integrator 156 from a valid speed reference signal which represents the value at which the speed reference signal becomes a reliable representation of the speed of the motive power shaft 18. The summer 168 produces a signal indicative of the difference between the speed reference signal and the valid speed reference signal. A zero crossing detector 170 detects when the speed reference signal equals or exceeds the valid speed reference and produces a high state signal on a line 172 at such time. The signals on the lines 166 and 172 are delivered to an AND gate 174 having an output which is coupled to and controls the controllable switch 160.

At the initiation of a start-up sequence, at which time the speed of the motive power shaft 18 is zero, the controllable switch 160 is set to a position which passes the output of the integrator 158 to the output of the controllable switch 160, and thus to the summer 54 of FIG. 2. Also at this time, power is applied to the exciter portion 14, and hence to the main generation portion field winding 34 of FIG. 1A, and power is also applied to the main generator armature windings 36a-36c. The motive power shaft 18 is thus accelerated. When the error between the rotor position, as measured by the angle reconstruction unit 44 of FIG. 2, and the position reference signal, as derived by the integrator 158, is less than the error reference and when the speed reference signal produced by the integrator 156 is equal to or greater than the valid speed reference signal, the high state signals on the lines 166 and 172 cause the AND gate 174 to move the controllable switch 160 to the position shown in FIG. 6. The controllable switch 160 is latched in such position so that the output of the angle reconstruction unit 44 of FIG. 2 is thereafter provided to the summer 54 of FIG. 2. The controllable switch 160 remains latched until a new start-up sequence is initiated.

The output of the summer 162 is also conditioned by a gain unit 176 and is supplied to a first input of a summer 178. A speed error signal is developed by a summer 180 which subtracts the rotor speed signal developed by the angle reconstruction unit 44 of FIG. 2 from the speed reference signal developed by the integrator 156. The speed error signal is processed by a gain unit 182 and is summed with the output of the gain unit 176 by the summer 178. A limiter 184 provides limiting for the output of the summer 178 and develops a current limited torque command signal on the line 48 of FIG. 2.

Figure 7:
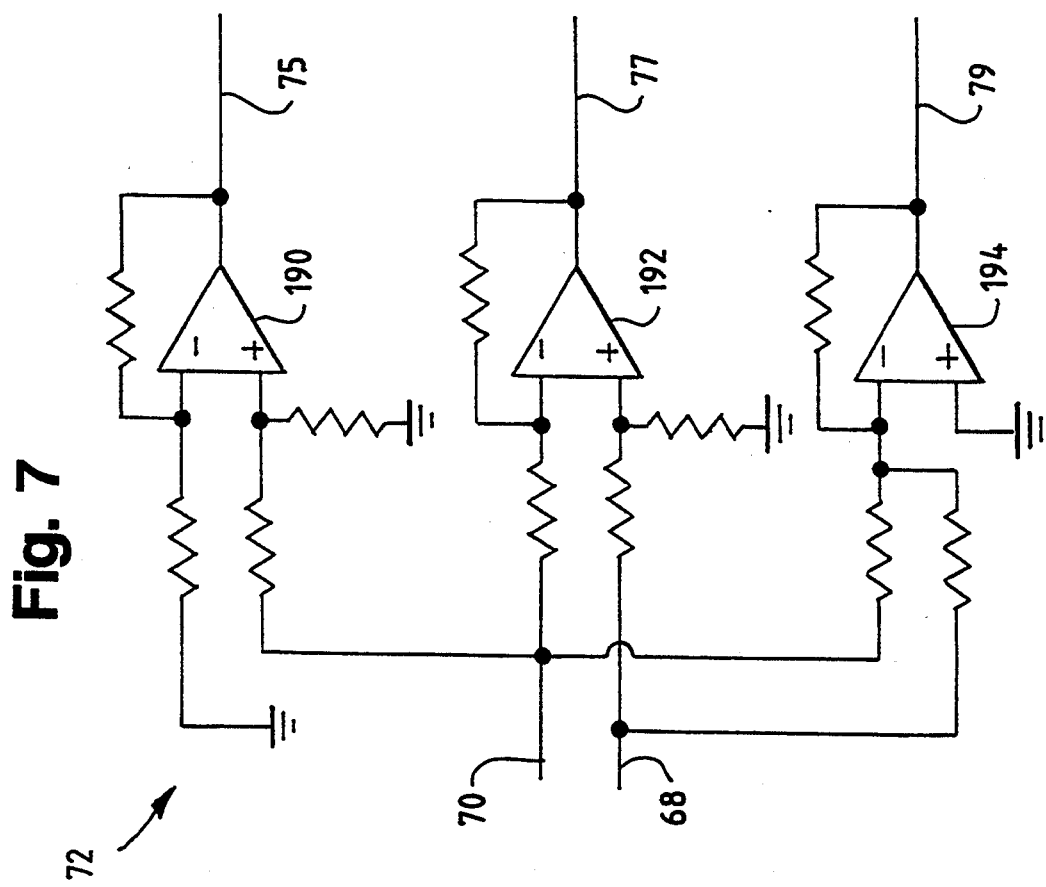
FIG. 7 comprises a circuit diagram of the phase converter of FIG. 2.

FIG. 7 illustrates in greater detail the converter 72 shown schematically in FIG. 2. The converter 72 includes three operational amplifiers 190, 192, 194 and associated biasing circuitry connected to the lines 68, 70 which generate outputs on the lines 75, 77, 79.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A detector for detecting rotor position of a brushless generator having a motive power shaft and a main generator portion having first and second main generator portion armature phase windings capable of receiving AC power add developing a back EMF voltage during operation in a starting mode, comprising:

means coupled to the first and second main generator portion armature phase windings and capable of responding to the AC power for producing a back EMF estimate signal representing an estimate of the back EMF voltage, said producing means including;

first means responsive to currents developed in said first and second main generator portion armature phase windings for developing a current magnitude signal;

second means responsive to voltages developed at the first and second main generator portion armature phase windings for developing a line-to-line voltage signal; and means responsive to the current magnitude signal and the line-to-line voltage signal for deriving the back EMF estimate signal; and means for converting the back EMF estimate signal into an indication of angular position of the motive power shaft.

2. The detector of claim 1, wherein the deriving means includes a first summer connected to said first developing means and having a negative input receiving the current magnitude signal, a second summer connected to said second developing means and having a positive input receiving the line-to-line voltage signal, third means connected to an output of said second summer for developing a current estimate signal, said current estimate signal being supplied to a positive input of said first summer, said first summer subtracting said current magnitude signal from said current estimate signal to obtain a first summer output signal, a first feedback loop including a first conditioner for conditioning the first summer output signal to produce the back EMF estimate signal, and for transmitting the back EMF estimate signal to a negative input to said second summer, and a second feedback loop connected to said third developing means for transmitting the current estimate signal to a negative input of said second summer, said second feedback loop including a second conditioner for conditioning the current estimate signal to obtain a conditioned current estimate signal for input to said second summer, the second summer subtracting the conditioned current estimate signal and the back EMF estimate signal from the line-to-line voltage signal.

3. The detector of claim 2, wherein the first developing means includes a third summer for adding a signal representing current flowing in the first main generator portion armature phase winding with a signal representing current flowing in the second main generator portion armature phase winding to produce the current magnitude signal.

4. The detector of claim 2, wherein the second developing means includes an amplifier responsive to the voltages developed at the first and second main generator portion armature phase windings and a low pass filter responsive to an output of the amplifier to produce the line-to-line voltage signal.

5. The detector of claim 2, wherein the third developing means includes a third conditioner for conditioning the second output signal to obtain a conditioned second output signal and an integrator for integrating the conditioned second output signal to produce the current estimate signal.

6. The detector of claim 1, wherein the converting means includes second means responsive to the back EMF estimate signal for deriving a number of interval pulses per revolution of the motive power shaft, means coupled to the second deriving means for measuring time periods between adjacent interval pulses and third means coupled to the measuring means for deriving the indication of the angular position of the motive power shaft from the measured time periods.

7. The detector of claim 6, wherein the measuring means includes a counter which accumulates clock pulses during time periods between adjacent interval pulses.

8. The detector of claim 7, wherein the measuring means further includes means responsive to the interval pulses for periodically resetting the counter a certain number of times during each revolution of the motive power shaft.

9. The detector of claim 7, wherein the third deriving means includes means for inverting a counter output signal developed by the counter to obtain an indication of the speed of the motive power shaft.

10. The detector of claim 9, wherein the third deriving means further includes an integrator coupled to the inverting means which develops the angular position indication.

11. A detector for detecting rotor position of a brushless generator having a motive power shaft and a main generator portion having a set of armature phase windings capable of receiving AC power and developing a back EMF voltage during Operation in a starting mode, comprising:

mean coupled to the set of armature phase windings and capable of responding to the AC power for producing a back EMF estimate signal representing an estimate of the back EMF voltage; and means for converting the back EMF estimate signal into an indication of angular position of the motive power shaft, said converting means including a phase-locked loop comprising:

a first zero crossing detector responsive to the back EMF estimate signal, a second zero crossing detector responsive to the indication of the angular position of the motive power shaft, a phase detector coupled to the first and second zero crossing detectors, and means coupled to the phase detector for obtaining the indication of the angular position of the motive power shaft.

12. The detector of claim 11, wherein the obtaining means includes an integrator coupled to a voltage-to-angle converter.

13. A starting system control for operating a brushless generator in a starting mode to convert electrical power into motive power wherein the brushless generator includes a motive power shaft and a main generator portion having a set of armature phase windings which receive AC power and in which a back EMF voltage is induced during operation in the starting mode, comprising:

means coupled to the set of armature phase windings and responsive to the AC power for producing a back EMF estimate signal representing an estimate of the back EMF voltage;

means for converting the back EMF estimate signal into indications of a speed and angular position of the motive power shaft; and means coupled to the converting means for delivering AC power to the set of armature phase windings in dependence upon the speed and angular position indications, said delivering means comprising:

first means for developing a torque command signal and an electrical angle command signal from the speed and angular position indications, and an inverter responsive to the torque command signal and the electrical angle command signal which develops the AC power.

14. The starting system control of claim 13, wherein the inverter is operated in a current mode of operation.

15. The starting system control of claim 13, wherein said delivering means further includes second means for converting the electrical angle command signal into a sine signal and a cosine signal, first and second multipliers coupled to the second converting means for multiplying the sine and cosine signals with the torque command signal to obtain a pair of current signals and third means for converting the pair of current signals into three three-phase signals.

16. The starting system control of claim 15, wherein said delivering means further includes:

means for generating a phase magnitude signal representing a magnitude of a phase current of the AC power;

three summers, each of said summers summing one of the three-phase signals with the phase magnitude signal to obtain an error signal; and an inverter control coupled between the summers and the inverter which operates the inverter in accordance with the error signals.

17. The starting system control of claim 13, further including means for generating a phase advance command and wherein the angular position indication comprises a position signal and wherein the first developing means includes a summer for summing the position signal with the phase advance command to obtain the electrical angle command signal.

18. The starting system control of claim 13, further including means for generating a phase advance command and wherein the motive power shaft is accelerated from zero speed to a particular speed over a series of revolutions, and the angular position indication comprises a position signal and wherein the first developing means includes a position reference signal generator which develops a position reference signal, a switch which provides the position reference signal to an output thereof during an initial portion of the series of revolutions and which provides the position signal to the output after the initial portion of the series of revolutions and a summer for summing the signal at the output of the switch with the phase advance command to obtain the electrical angle command signal.

19. The starting system control of claim 18, further including means for generating a speed command signal and wherein the first developing means further includes second means responsive to the speed command signal and the speed indication for developing a speed error signal, third means responsive to the position reference signal and the angular position indication for developing a position error signal and a further summer for summing the speed error signal and the position error signal.

20. The starting system control of claim 19, wherein the second developing means further includes a limiter coupled to the further summer which develops the torque command signal.

21. A starting system control for operating a brushless generator in a starting mode to convert electrical power into motive power wherein the brushless generator includes a motive power shaft and a main generator portion having first and second main generator portion armature phase windings which receive AC power and in which a back EMF voltage is induced during operation in the starting mode, comprising:

means coupled to the first and second main generator portion armature phase windings and responsive to the AC power for producing a back EMF estimate signal representing an estimate of the back EMF voltage, said producing means including first means responsive to the current flowing in said first and second main generator portion armature phase windings for developing a current magnitude signal, second means responsive to the voltages on the first and second main generator portion armature phase windings for developing a line-to-line voltage signal and means responsive to the current magnitude signal and to the line-to-line voltage signal for deriving the back EMF estimate signal;

means for converting the back EMF estimate signal into indications of speed and angular position of the motive power shaft; and means coupled to the converting means for delivering AC power to the first and second main generator portion armature phase windings in dependence upon the speed and angular position indications.

22. The starting system control of claim 21, wherein the deriving means includes a first summer connected to said first developing means and having a subtractive input receiving the current magnitude signal, a second summer connected to said second developing means and having an additive input receiving the line-to-line voltage signal, third means connected to an output of said second summer for developing current estimate signal, said current estimate signal being supplied to a positive input of said first summer, said first number subtracting said current magnitude signal from said current estimate signal to obtain a first summer output signal, a first feedback loop including a first conditioner for conditioning the first summer output signal to produce the back EMF estimate signal, and for transmitting the back EMF estimate signal to a negative input to said second summer, and a second feedback loop connected to said third developing means for transmitting the current estimate signal to a negative input of said second summer, said second feedback loop including a second conditioner for conditioning the current estimate signal to obtain a conditioned current estimate signal for input to said second summer, the second summer subtracting the conditioned current estimate signal and the back EMF estimate signal from the line-to-line voltage signal.

23. The starting system control of claim 21, wherein the converting means comprises a phase-locked loop including a first zero crossing detector responsive to the back EMF estimate signal, a second zero crossing detector responsive to the indication of the angular position of the motive power shaft, a phase detector coupled to the first and second zero crossing detectors and means coupled to the phase detector for producing the indication of the angular position of the motive power shaft.

24. The starting system control of claim 21, wherein the converting means includes second means responsive to the back EMF estimate signal for deriving a number of interval pulses per revolution of the motive power shaft, means coupled to the second deriving means for measuring time periods between adjacent interval pulses, and third means coupled to the measuring means for deriving an indication of the angular position of the motive power shaft from the measured time periods.

25. The starting system control of claim 24, wherein the measuring means includes a counter which accumulates clock pulses during time periods between adjacent interval pulses.

26. The starting system control of claim 25, wherein the counter is periodically reset by the interval pulses a certain number of times during each revolution of the motive power shaft.

27. The starting system control of claim 26, wherein the third deriving means includes means for inverting a counter output signal developed by the counter to obtain an indication of the speed of the motive power shaft and an integrator coupled to the inverting means which develops the angular position indication.

28. A method of detecting rotor position of a brushless generator having motive power shaft and a main generator portion having first and second main generator portion armature phase windings which receive AC power and which develop a back EMF voltage during operation in a starting mode, the method comprising the steps of:
  estimating the back EMF voltage developed at the first and second main generator portion armature phase windings to produce a back EMF estimate signal, said estimating steps comprising the steps of;
  combining signals representing currents flowing in said first and second main generator portion armature phase windings to develop a current magnitude signal,
  combining signals representing the voltages developed at the first and second main generator portion armature phase windings to develop a line-to-line voltage signal and
  deriving the back EMF estimate signal from the current magnitude signal and the line-to-line voltage signal;
  converting the back EMF estimate signal into an indication of angular position of the motive power shaft; and
  delivering AC power to the first and second main generator portion armature phase windings in dependence upon the angular position indication.

29. The method of claim 28, wherein the step of deriving includes the steps of;
  developing a current estimate signal;
  subtracting the current magnitude signal from the current estimate signal to produce a difference signal;
  conditioning the difference signal to produce the back EMF estimate signal;
  combining the current estimate signal with the back EMF estimate signal and the line-to-line voltage signal to produce a summed signal; and
  obtaining the current estimate signal from the summed signal.

30. A method of detecting rotor position of a brushless generator having a motive power shaft and a main generator portion having a set of armature phase windings which receive AC power and which develop back EMF voltage during operation in a starting mode, the method comprising the steps of:
  estimating the back EMF voltage developed at the set of armature phase windings to produce a back EMF estimate signal; and
  converting the back EMF estimate signal into an indication of angular position of the motive power shaft, said converting step including the steps of deriving a number of interval pulses per revolution of the motive power shaft from the back EMF estimate signal, measuring time periods between adjacent interval pulses and converting the measured time periods into the indication of the angular position of the motive power shaft.

31. The method of claim 30, wherein the step of measuring includes the step of accumulating clock pulses in a counter during time periods between adjacent interval pulses.

32. The method of claim 31, wherein the step of measuring includes the step of inverting a counter output signal developed by the counter to obtain speed indication and accumulating the inverted counter output signal to develop the angular position indication.

33. A back EMF voltage estimator for use in a brushless generator having a motive power shaft and a main generator portion having first, second and third armature phase windings capable of receiving AC power with a flow of current therethrough and generating a line-to-line voltage therebetween and capable of developing a back EMF voltage during operation in a starting mode, comprising:
  first means responsive to currents flowing in the first and second armature phase windings for developing a current magnitude signal;
  second means responsive to voltages developed at the first and second armature phase windings for developing a line-to-line voltage signal; and
  means responsive to the current magnitude signal and to the line-to-line voltage signal for deriving the back EMF estimate signal.

34. A back EMF voltage estimator for use in a brushless generator having a motive power shaft and a main generator portion having first, second and third armature phase windings capable of receiving AC power and capable of developing a back EMF voltage during Operation in a starting mode, comprising:
  first means responsive to currents flowing in the first and second armature phase windings for developing a current magnitude signal;
  second means responsive to voltages developed at the first and second armature phase windings for developing a line-to-line voltage signal;
  third means for developing current estimate signal; and
  means responsive to the current magnitude signal and to the line-to-line voltage signal for deriving the back EMF estimate signal the deriving means including a first summer for subtracting the current magnitude signal from the current estimate signal to produce a first output signal, a first conditioner for conditioning the first output signal to produce the back EMF estimate signal, a combiner for combining the current estimate signal, the back EMF estimate signal and the line-to-line voltage signal to produce a second output signal, said third means responsive to the second output signal for developing the current estimate signal.

35. The estimator of claim 34, wherein the combiner includes a second conditioner which conditions the current estimate signal to produce a conditioned current estimate signal and a second summer which subtracts the conditioned current estimate signal and the back EMF estimate signal from the line-to-line voltage signal to produce the second output signal.

36. The estimator of claim 35, wherein the third developing means includes a third conditioner for conditioning the second output signal to produce a conditioned output signal and an integrator for integrating the conditioned output signal to produce the current estimate signal.

* * * * *